United States Patent
Asado

(10) Patent No.: US 8,923,911 B2
(45) Date of Patent: Dec. 30, 2014

(54) COMMUNICATION SYSTEM, CONTROL APPARATUS AND BASE STATION APPARATUS

(75) Inventor: Hideki Asado, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 273 days.

(21) Appl. No.: 13/580,871

(22) PCT Filed: Feb. 22, 2011

(86) PCT No.: PCT/JP2011/000987
§ 371 (c)(1),
(2), (4) Date: Aug. 23, 2012

(87) PCT Pub. No.: WO2011/105052
PCT Pub. Date: Sep. 1, 2011

(65) Prior Publication Data
US 2012/0322436 A1    Dec. 20, 2012

(30) Foreign Application Priority Data

Feb. 23, 2010  (JP) ................................. 2010-037763

(51) Int. Cl.
| | | |
|---|---|---|
| H04B 7/00 | (2006.01) | |
| H04M 1/00 | (2006.01) | |
| H04B 7/185 | (2006.01) | |
| H04W 52/14 | (2009.01) | |
| H04W 52/38 | (2009.01) | |
| H04W 52/24 | (2009.01) | |
| H04W 88/08 | (2009.01) | |
| H04W 8/26 | (2009.01) | |

(52) U.S. Cl.
CPC .......... *H04W 52/143* (2013.01); *H04W 52/383* (2013.01); *H04W 88/08* (2013.01); *H04W 52/247* (2013.01); *H04W 8/26* (2013.01)
USPC ........................... 455/522; 455/13.4; 455/561

(58) Field of Classification Search
CPC ..... H04W 16/00; H04W 16/24; H04W 16/26; H04W 52/00; H04W 52/04; H04W 52/143
USPC .......................................... 455/561, 13.4, 522
See application file for complete search history.

(56) References Cited

U.S. PATENT DOCUMENTS 8,391,158 B2 * 3/2013 Gupta et al. .................. 370/241
(Continued)

FOREIGN PATENT DOCUMENTS

JP       7-170566 A       7/1995
(Continued)

OTHER PUBLICATIONS

"Evolved Universal Terrestrial Radio Access (E-UTRA) and Evolved Universal Terrestrial Radio Access Network (E-UTRAN)", ETSI TS 136 300 V8.11.0 (Feb. 2010).
(Continued)

*Primary Examiner* — Marisol Figueroa
(74) *Attorney, Agent, or Firm* — Studebaker & Brackett PC

(57) ABSTRACT

A communication system, a control apparatus and a base station apparatus, capable of changing PCI of the base station apparatus without causing a hole in coverage, are provided. A communication system 101 according to the present invention including a base station apparatus 103 and a neighboring base station apparatus 105 adjacent to the base station apparatus includes a transmission power control unit 107, when an identification number of the base station apparatus 103 is changed, configured to instruct the neighboring base station apparatus 105 to increase transmission power before the identification number is changed such that a communication area of the neighboring base station apparatus 105 covers that of the base station apparatus 103. The neighboring base station apparatus 105 increases the transmission power according to the instruction.

9 Claims, 4 Drawing Sheets

(56) References Cited

U.S. PATENT DOCUMENTS

| | | | |
|---|---|---|---|
| 8,559,952 B2 * | 10/2013 | Frenger et al. | 455/436 |
| 2010/0329189 A1 | 12/2010 | Tsuboi et al. | |
| 2011/0190027 A1 * | 8/2011 | Michel et al. | 455/522 |
| 2014/0044048 A1 | 2/2014 | Tsuboi et al. | |
| 2014/0071891 A1 * | 3/2014 | Zhou et al. | 370/328 |

FOREIGN PATENT DOCUMENTS

| | | |
|---|---|---|
| JP | 2005-10821 A | 1/2005 |
| JP | 2007-116391 A | 5/2007 |
| WO | 2009096364 A1 | 8/2009 |

OTHER PUBLICATIONS

"SON Use Case: Cell Phy_ID Automated Configuration", 3GPP TSG-RAN WG3 Meeting #59, Sorrento, Italy, Feb. 11-15, 2008.

International Search Report mailed Mar. 29, 2011 from corresponding International Application No. PCT/JP2011/000987.

An Office Action; "Notice of Reason for Rejection," issued by the Japanese Patent Office on Jan. 14, 2014, which corresponds to Japanese Patent Application No. 2010-037763 and is related U.S. Appl. No. 13/580,871; with English language concise explanation.

Samsung; 3GPP TSG RAN WG3 Meeting #65; "Consideration on having Neighbour information of HeNB"; R3-091678; Aug. 24-28, 2009; Shenzhen, China.

* cited by examiner

FIG. 4A

THICK FRAME : LOGICAL AREA

PCI
CELL

FIG. 4B

CELL OF NEW BASE STATION APPARATUS

FIG. 4C

COMMUNICATION SYSTEM, CONTROL APPARATUS AND BASE STATION APPARATUS

CROSS REFERENCE TO RELATED APPLICATION

This application claims priority to and the benefit of Japanese Patent Application No. 2010-037763 (filed on Feb. 23, 2010), the entire contents of which are incorporated herein by reference.

TECHNICAL FIELD

The present invention relates to a communication system, a control apparatus and a base station apparatus, and more specifically, to a communication system, a control apparatus and a base station apparatus associated with change of an identification number of the base station apparatus in the communication system.

BACKGROUND ART

As a next generation radio communication method of a world standard, an LTE (Long Term Evolution) system is standardized by 3GPP (3rd Generation Partnership Project). The 3GPP and NGMN (Next Generation Mobile Network) have been consulting as to SON (Self Organizing Network) for the purpose of a reduction in maintenance cost by operators and automated network optimization in the LTE system. Functions of the SON are classified into four categories: Planning, Development, Optimization and Maintenance. It has been expected to substantialize a stable network by adopting the functions of the SON to efficient maintenance/configuration/planning of the network such as optimization of radio parameters and network parameters, interference control and addition of a neighbor cell list. Especially if a self-configuration process and a self-optimization process are substantialized by automation of works that used to be manually operated by the operators, network maintenance cost may be minimized. The self-configuration process is defined as a process, in installation of a new base station apparatus eNB (evolved Node B), for automatically acquiring and setting a basic parameter necessary for system maintenance. The self-configuration process is considered as a process conducted mainly before the base station apparatus comes into an operation state. The self-optimization process is defined as a process, based on statistical data from a terminal UE (User Equipment) and a base station apparatus, for performing automatic regulation of the network. The self-optimization process is considered as a process started after start-up of an RF apparatus and conducted when the base station apparatus is in the operation state. An example of the self-optimization process is optimization of a neighboring base station list.

One of more detailed aims of SON is to automatically set PCI (Physical Cell ID), which is an identification number of a cell of the base station apparatus. The PCI is a parameter inevitable for the cell and the terminal needs the PCI in order to synchronize with the cell. Since the number of unique PCIs that E-UTRAN (Evolved Universal Terrestrial Radio Access Network), one specification of LTE, may have is limited to 504, it is unavoidable to assign the same PCI to different cells when the number of cells exceeds 504. However, when the cells with the same PCI are positioned close to one another, communications of the cells are interfered, possibly disabling a voice call or handover. Therefore, it is necessary to satisfy two conditions: (1) the PCI of a first cell of a first base station must be different from the PCI of a second cell of a second base station adjacent to the first base station, and (2) the PCI of the first cell of the first base station must be different from the PCI of a third cell of a third base station adjacent to the second base station. The base station apparatus may acquire information about the PCI of the cell of the neighboring base station apparatus from the neighboring base station list (neighbor cell list) held by each base station apparatus.

Recently, 3GPP has been suggesting a framework in which, when a new base station apparatus is installed, the new base station apparatus autonomously selects and sets the PCI for the cell thereof (for example, see Non-Patent Document 1 listed below). In detail, the base station apparatus selects the PCI of the cell thereof based on Centralized PCI assignment algorithm or distributed PCI assignment algorithm. According to Centralized PCI assignment algorithm, the base station apparatus is notified of a unique PCI by OAM (Operation Administration and Maintenance) and sets the unique PCI for the cell thereof. On the other hand, according to distributed PCI assignment algorithm, the base station apparatus is notified of a PCI list including available PCIs by OAM and, by removing unsuitable PCIs from the list, selects any PCI remained in the list and sets the PCI for the cell thereof.

In addition to Centralized PCI assignment algorithm and distributed PCI assignment algorithm described above for setting the PCI before start-up of the new base station apparatus, there is also suggested a method for setting the PCI after start-up of the new base station apparatus (for example, see Non-Patent Document 2). According to this method, the new base station apparatus first selects any value from 504 candidate PCIs as Temporary PCI in a configuration phase and is started up. Then, the new base station apparatus, with an ANR (Automatic Neighbor Relation) function, acquires information about the neighboring base station apparatuses notified by the terminals and creates the neighboring base station list. Further, the new base station apparatus obtains the neighboring base station list from the neighboring base station apparatuses. The new base station apparatus then selects the PCI satisfying both of the above conditions (1) and (2) from the created neighboring base station list and the acquired neighboring base station list.

RELATED ART DOCUMENTS

Non-Patent Documents

Non-Patent Document 1: 3GPP TS 36.300 22.3.5 Framework for PCI Selection

Non-Patent Document 2: 3GPP R3-080376:SON Use Case: Cell Phy ID Automated Configuration

SUMMARY OF INVENTION

Technical Problem

However, Centralized PCI assignment algorithm and distributed PCI assignment algorithm described in the Non-Patent Document 1 only indicate a framework of a PCI automatic setting method and have no description about a detailed algorithm for how to find the PCI satisfying the above conditions (1) and (2). Therefore, the PCI that fails to satisfy the conditions (1) and (2) may possibly be assigned to the new base station apparatus, in which case the PCI needs to be reset. In order to reset the PCI, the base station apparatus needs to restart and to notify a radio channel with a new PCI. The method described in the Non-Patent Document 2 also requires restarting the base station apparatus when the base station apparatus replaces the Temporary PCI with the PCI satisfying the conditions (1) and (2). While the base station apparatus is restarting, a link is disconnected causing a hole, or loss, (communication disabled area) in coverage (a communication area). Therefore, the communication area of the terminals in the cell of the base station apparatus restarting is limited.

Also, the methods described in the Non-Patent Documents 1, 2 relate to PCI setting when the base station is newly installed and leave change of an already set PCI out of consideration. However, when the new base station apparatus needs to be installed at a position with no PCI satisfying both of the above conditions (1) and (2), the existing PCI of the base station apparatus needs to be changed. The existing PCI of the base station apparatus needs to be changed when, for example, the number of base station apparatuses is insufficient due to increase in a total number of terminals or when the communication disabled area is caused because of a tall building. In order to supplement or extend the coverage, the base station apparatus may have to change the PCI of its cell in the self-optimization process. Or, because of a trouble caused by installment of a multi-vendor base station apparatus, an existing base station apparatus may have to change its PCI. In both cases, the base station apparatus needs to restart, which may cause a hole in the coverage.

Accordingly, an object of the present invention in consideration of the above problem of conventional techniques is to provide a communication system, a control apparatus and a base station apparatus capable of changing the PCI of the base station apparatus without causing a hole in the coverage.

Solution to Problem

In order to solve the above problem, a communication system including a base station apparatus and a neighboring base station apparatus adjacent to the base station apparatus according to a first aspect of the present invention includes:

a transmission power control unit configured to instruct the neighboring base station apparatus, when an identification number of the base station apparatus is changed, to increase transmission power before the identification number is changed such that a communication area of the neighboring base station apparatus covers that of the base station apparatus, wherein the neighboring base station apparatus increases the transmission power according to the instruction.

It is preferable that, when the identification number is changed, the base station apparatus stops operation and the transmission power control unit instructs the base station apparatus to resume operation and also instructs the neighboring base station apparatus to restore original transmission power.

It is also preferable that a control apparatus independent from the base station apparatus and the neighboring base station apparatus has the transmission power control unit.

It is also preferable that one or both of the base station apparatus and the neighboring base station apparatus has (have) the transmission power control unit.

In order to solve the above problem, a communication system including a base station apparatus and a neighboring base station apparatus adjacent to the base station apparatus according to a second aspect of the present invention includes:

a transmission power control means configured to instruct the neighboring base station apparatus, when an identification number of the base station apparatus is changed, to increase transmission power before the identification number is changed such that a communication area of the neighboring base station apparatus covers that of the base station apparatus, wherein the neighboring base station apparatus increases the transmission power according to the instruction.

It is preferable that the base station apparatus stops operation when the identification number thereof is changed, and the transmission power control means, when the identification number of the base station apparatus is changed, instructs the base station apparatus to resume operation and also instructs the neighboring base station apparatus to restore original transmission power.

In order to solve the above problem, a control apparatus for controlling a base station apparatus and a neighboring base station apparatus adjacent to the base station apparatus according to a third aspect of the present invention, when an identification number of the base station apparatus is changed, instructs the neighboring base station apparatus to increase transmission power before the identification number is changed such that a communication area of the neighboring base station apparatus covers that of the base station apparatus.

It is preferred that the control apparatus, when the identification number of the base station apparatus is changed and the base station apparatus stops operation, instructs the base station apparatus to resume operation and also instructs the neighboring base station apparatus to restore original transmission power.

In order to solve the above problem, a base station apparatus in a communication system according to a fourth aspect of the present invention includes:

a transmission power control unit configured to instruct a neighboring base station apparatus, when an identification number of the base station apparatus itself is changed, to increase transmission power before the identification number is changed such that a communication area of the neighboring base station apparatus covers that of the base station apparatus.

Effect of the Invention

According to the communication system, the control apparatus and the base station apparatus of the present invention described above, since the transmission power control unit or the transmission power control means, before the identification number of the base station apparatus is changed, makes the neighboring base station apparatus increase the transmission power such that the communication area of the neighboring base station apparatus covers that of the base station apparatus, the identification number may be changed without causing a hole in coverage.

BRIEF DESCRIPTION OF DRAWINGS

FIG. 4A is a diagram illustrating a state that requires changing the PCI;

FIG. 4B is a diagram illustrating a state that requires changing the PCI; and

FIG. 4C is a diagram illustrating a state that requires changing the PCI.

DESCRIPTION OF EMBODIMENT

An embodiment of the present invention will be described with reference to the accompanying drawings.

Figure 1:
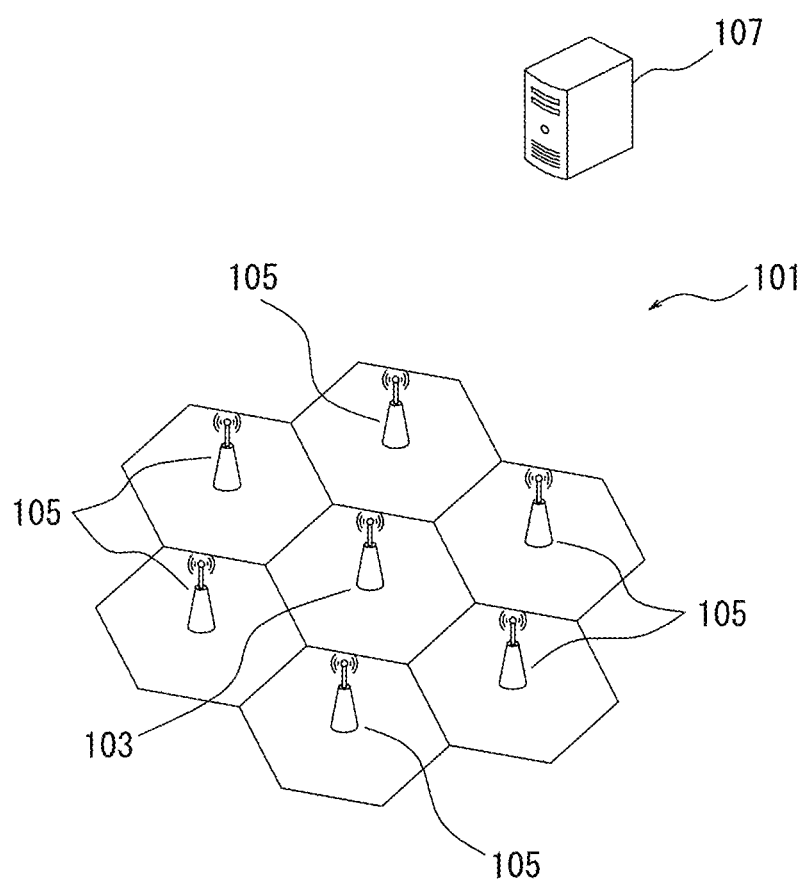
FIG. 1 is a diagram illustrating a schematic configuration of an overall communication system according to one embodiment of the present invention.

FIG. 1 is a diagram illustrating a schematic configuration of an overall communication system according to one embodiment of the present invention. A communication system 101 according to the present invention includes a base station apparatus 103, neighboring base station apparatuses 105 and an external control apparatus 107 (referred to as a control apparatus having a transmission power control unit in Claims).

The base station apparatus 103 and the neighboring base station apparatuses 105 communicate with mobile phones (not illustrated) and are referred to as eNB in LTE system. A cell in a hexagon shape surrounding the base station apparatus 103 in FIG. 1 represents an area (referred to as a communication area in Claims) that allows the base station apparatus 103 to communicate with the mobile phones. The neighboring base station apparatuses 105 are adjacent to the base station apparatus 103. Each cell (an area in the hexagon shape surrounding each of the neighboring base station apparatuses 105) of the neighboring base station apparatuses 105 is adjacent to the cell of the base station apparatus 103. Each cell of the base station apparatus 103 and the neighboring base station apparatuses 105 is assigned PCI (referred to as an identification number in Claims). By using the PCI, the terminal may identify the base station apparatus for communication. The base station apparatus 103 holds a neighboring base station list including the PCIs assigned to the cells of the neighboring base station apparatuses 105. The neighboring base station apparatus 105 has a neighboring base station list including the PCIs of neighboring base station apparatuses (not illustrated) adjacent to the neighboring base station apparatus 105.

The external control apparatus 107 manages and controls the overall communication system 101 including the base station apparatus 103 and the neighboring base station apparatuses 105 and may be constituted by, for example, EMS (Element Management System) or NMS (Network Management System). In detail, the external control apparatus 107 instructs the neighboring base station apparatuses 105 to increase transmission power of radio waves for communication with the terminal and also instructs the base station apparatus 103 to stop or resume operation when the PCI is changed. The external control apparatus 107 controls a timing at which the neighboring base station apparatuses 105 increase the transmission power and a timing at which the base station apparatus 103 starts or stop operation. Thereby, the external control apparatus 107 may make the neighboring base station apparatuses 105 extend their cells by increasing the transmission power before the PCI is changed. When the extended cells of the neighboring base station apparatuses 105 cover the cell of the base station apparatus 103, a hole in coverage is prevented when the base station apparatus 103 stops operation as the PCI is changed.

Figure 2:
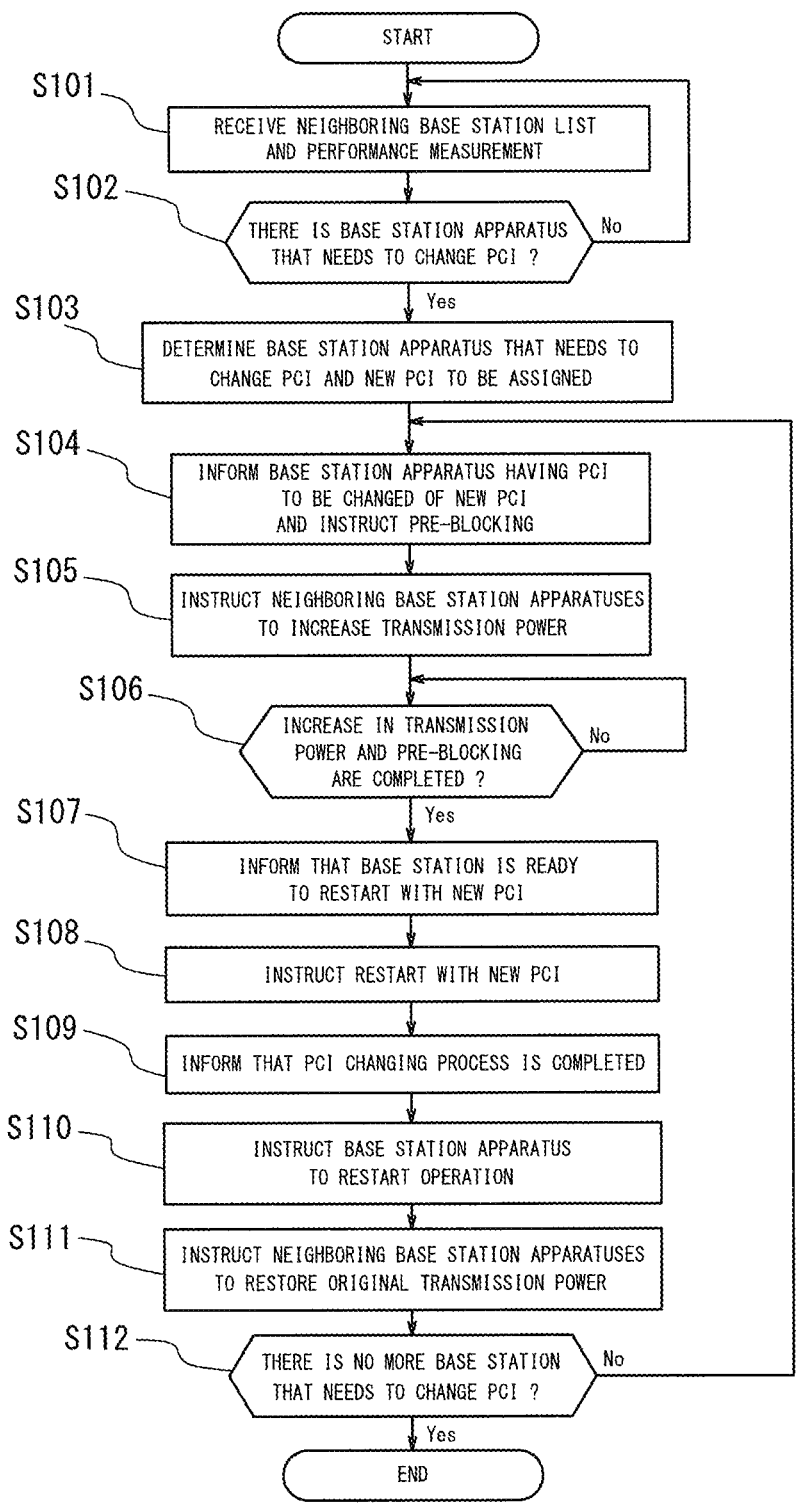
FIG. 2 is a flowchart illustrating a method for changing PCI of a base station apparatus.

A method for changing the PCI of the base station apparatus 103 by the communication system 101 while the base station apparatus 103 and the neighboring base station apparatuses 105 in FIG. 1 are in operation will be described with reference to FIG. 2 and FIG. 3. FIG. 2 is a flowchart illustrating a method for changing the PCI of the base station apparatus and FIG. 3 is a diagram illustrating the method for changing the PCI of the base station apparatus.

The external control apparatus 107, from the base station apparatus 103 and the neighboring base station apparatuses 105 under the management and the control thereof, receives their respective neighboring base station lists and Performance Measurement (statistical data) including information about the transmission power of the radio waves of each of the base station apparatuses for communication with the terminals (step S101). An operation at step S101 is repeated periodically while there is no base station apparatus that needs to change the PCI (No at step S102).

When there is a base station apparatus that needs to change the PCI (Yes at step S102), the external control apparatus 107 starts a PCI changing process.

Figure 3:
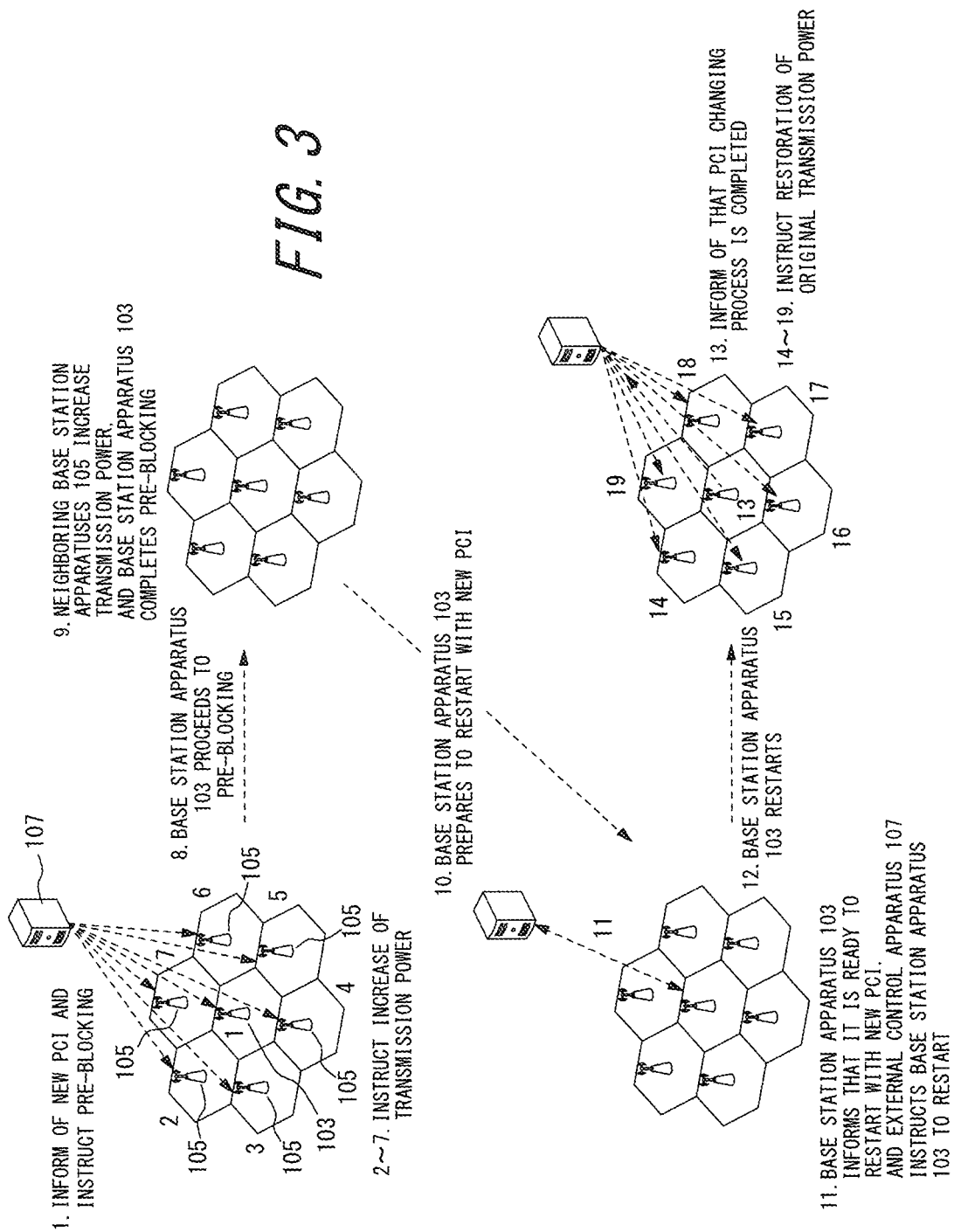
FIG. 3 is a diagram illustrating the method for changing the PCI of the base station apparatus.

The external control apparatus 107 determines the base station apparatus that needs to change its PCI and a new PCI to be assigned to the base station (step S103 and FIG. 3-1). When there are a plurality of base station apparatuses that need to change their PCIs, the external control apparatus 107 determines new PCIs for all of those base station apparatuses and also an order to change the PCIs. The external control apparatus 107 may preferentially change the PCI of the base station apparatus that seems to have less influence on a management service. For example, the external control apparatus 107 may determine the order based on information about intensity of the transmission power and the number of terminals in communication with the base station apparatus. The new PCI needs to satisfy both of two conditions: (1) to be different from the PCIs of the neighboring base station apparatuses adjacent to the base station apparatus and (2) to be different from the PCIs of base station apparatuses adjacent to the neighboring base station apparatus. That is, when the base station apparatus 103 needs to change the PCI, the new PCI to be assigned, in order to satisfy the above two conditions, needs to be at a value existing in neither the neighboring base station list held by the base station apparatus 103 nor the neighboring base station lists held by the neighboring base station apparatuses 105.

The external control apparatus 107 notifies the base station apparatus 103 having the PCI to be changed of the new PCI and instructs the base station apparatus 103 to perform pre-blocking (step S104). Pre-blocking is an operation to stop a communication function after disconnection of a connected outgoing call, without forcing disconnection.

Subsequently, the external control apparatus 107 instructs the neighboring base stations 105 to increase the transmission power such that the cells of the neighboring base station apparatuses 105 cover the cell of the base station apparatus 103 (step S105, FIGS. 3-2 to 7). During that time, the base station apparatus 103 proceeds to pre-blocking (FIG. 3-8).

Since the neighboring base station apparatuses 105 increase the transmission power as described above, the coverage in the communication system 101 is maintained when the base station apparatus 103 stops operation. Note that the neighboring base station apparatuses 105 may cover the cell of the base station apparatus 103 by performing beamforming. Beamforming is a technique to direct (increase) the transmission power in a particular direction by using a radio wave directivity control that allows reduction in interference with the radio waves and a more flexible formation of the coverage.

As illustrated in FIG. 3-9, the external control apparatus 107 determines whether increase in the transmission power by the neighboring base station apparatuses 105 and pre-blocking of the base station apparatus 103 are completed (step S106).

After pre-blocking is completed (Yes at step S106), the base station apparatus 103 prepares to restart with the new PCI (FIG. 3-10). The base station apparatus 103 changes its PCI to the new PCI and, after preparing to restart, notifies the external control apparatus 107 of that the base station apparatus 103 is ready to restart with the new PCI (step S107, FIG. 3-11).

Upon receiving the notification, the external control apparatus 107 instructs the base station apparatus 103 to restart with the new PCI (step S108, FIG. 3-11).

Upon receiving the instruction to restart with the new PCI, the base station apparatus 103 stops operation and restarts (FIG. 3-12). After the restart, the new PCI is assigned to the cell of the base station apparatus 103 and the base station apparatus 103 notifies the external control apparatus 107 of that the PCI changing process is completed (step S109 and FIG. 3-13). The external control apparatus 107 instructs the base station apparatus 103 to restart with the new PCI (step S110). Thereby, the base station apparatus 103 may communicate with the terminals again.

The external control apparatus 107 instructs the neighboring base station apparatuses 105 to restore original transmission power (step S111, FIG. 3-14 to 19). A timing at which the neighboring base station apparatuses 105 restore the original transmission power is not limited to the instruction from the external control apparatus 107. For example, the neighboring base station apparatuses 105 may have timers and, when a time equal to or longer than a time required for restart of the base station apparatus is set, restore the original transmission power at the timing when the timer expires. The time required for restart of each base station apparatus may be included in the Performance Measurement such that information about the time required for restart is shared in the communication system 101.

The external control apparatus 107 determines whether there is no more base station apparatus in the communication system 101 that needs to change the PCI (step S112). When there is a base station apparatus that needs to change the PCI (No at step S111), the external control apparatus 107 repeats operations between step S104 and step S111. When there is no base station apparatus that needs to change the PCI (Yes at step S111), the external control apparatus 107 ends the PCI changing process.

In the above embodiment, the method for changing the PCI of the base station apparatus without causing a hole in the coverage is described. The following is a description of circumstances that require changing the PCI, with reference to FIGS. 4A-4C. FIGS. 4A-4C are diagrams illustrating circumstances that require changing the PCI.

FIG. 4A illustrates an exemplary arrangement of the cells of the base station apparatuses. In FIG. 4A, each of 36 square boxes represents the cell of the base station apparatus. Each cell includes the base station apparatus. The number indicated in the cell represents the PCI assigned thereto. Although E-UTRAN of the LTE system can use 504 PCIs in total, the number of usable PCIs is 9 here, for convenience sake. A logical area is constituted of the cells having the PCIs numbered 1 through 9. In FIG. 4A, for example, there are 4 logical areas in thick frames.

It is assumed that, for the purpose of stabilization of communication quality, installation of a new base station is necessary at a center as shown in FIG. 4B. The PCI assigned to the new base station apparatus needs to satisfy the above two conditions (1) and (2). Here, the PCIs 1-9, i.e., the PCIs (1, 4, 5, 6) and the PCIs (2, 3, 7, 8, 9) are already assigned, respectively, to the neighboring base station apparatus adjacent to the new base station apparatus and another neighboring base station apparatus adjacent to the neighboring base station apparatus. Therefore, in order to assign the PCI satisfying the two conditions (1) and (2) to the new base station apparatus, it is necessary to change the PCIs already assigned to other cells.

Here, for example, the PCIs of cells A-H in FIG. 4B are changed. In detail, in order to exchange the PCI of the cell A for that of the cell E, the PCI of the cell A is changed from 9 to 5 and the PCI of the cell E is changed from 5 to 9. Similarly, the PCI of the cell B is exchanged for that of the cell F, the PCI of the cell C is exchanged for that of the cell G, and the PCI of the cell D is exchanged for that of the cell H. When the PCI of each of the cells A-H is changed, the neighboring base station apparatuses of the cells increase the transmission power before restart. Thereby, the PCIs may be changed without causing a hole in the coverage. After change of the PCI of each of the cells A-H, the PCI "9" is assigned to the new base station apparatus. Accordingly, the PCIs of each of the cells become as illustrated in FIG. 4C. As the new base station apparatus is installed, the logical area is changed and 4 logical areas share the new base station apparatus as illustrated in FIG. 4C. The cells at four corners (the PCIs of the cells are all 9) belong to logical areas different from the four logical areas in FIG. 4C. As described above, when there is no PCI satisfying the conditions (1) and (2) in assigning the PCI to the new base station apparatus, the PCIs of the existing base station apparatuses need to be changed.

According to the present embodiment, as described above, the communication system 101 has the external control apparatus 107 (control apparatus having the transmission power control unit) that, when the PCI (identification number) of the base station apparatus 103 is changed, instructs the neighboring base station apparatuses 105 to increase the transmission power before the identification number is changed such that the communication areas of the neighboring base station apparatuses 105 cover the communication area of the base station apparatus 103. The neighboring base station apparatuses 105 increase the transmission power according to the instruction. When the base station apparatus 103 restarts to change the PCI, the communication area of the base station apparatus 103 is disabled. However, since the neighboring base station apparatuses 105 increase the transmission power before the PCI is changed such that the communication areas of the neighboring base station apparatuses 105 extend to cover the communication area of the base station apparatus 103, a communication disabled area caused due to restart of the base station apparatus 103 may be prevented. That is, the PCI may be changed without causing a hole in the coverage.

According to the present embodiment, also, the base station apparatus 103 stops operation when its PCI is changed, and the external control apparatus 107, when the PCI of the base station apparatus 103 is changed, instructs the base station apparatus 103 to restart operation and also instructs the neighboring base station apparatuses 105 to restore the original transmission power. Since the original transmission power of the neighboring base station apparatuses 105 is restored after the base station apparatus 103 changes its PCI and restarts operation, a hole is not caused in the coverage and the transmission power of the neighboring base station apparatuses 105 are prevented from overconsumption.

Although the present invention is described based on the figures and the embodiment, it is to be understood that those who are skilled in the art may easily vary or alter in a multiple manner based on disclosure of the present invention. Accordingly, such variation and alteration are included in a scope of the present invention. For example, a function or the like of each member, means or step may be rearranged avoiding a logical inconsistency, by combining a plurality of means or steps or by dividing the means or the step.

In the embodiment of the present invention set forth above, the transmission power control unit described in Claims for controlling the base station apparatus and the neighboring base station apparatus is a composition element of the external control apparatus independent from the base station apparatus and the neighboring base station apparatus. However, the present invention may be substantiated by incorporating the transmission power control unit in one or both of the base station apparatus and the neighboring base station apparatus. In this case, the base station apparatus that needs to change the PCI transmits information for notifying the neighboring base station apparatus that the PCI is going to be changed, through a communication via an X2 interface between the base stations. Upon receiving the information, the neighboring base station apparatuses increase the transmission power and, when having completed increasing the transmission power, transmit information indicating accordingly to the base station apparatus. The base station apparatus restarts to change the PCI and, after restarting operation with the new PCI, transmits information for instructing the neighboring base station to reduce the transmission power.

Also, in the embodiment of the present invention set forth above, the external control apparatus (transmission power control unit) has a function to change the PCI without causing the communication disabled area, and such a function is substantialized by exchange of information using a predetermined control channel (transmission power control means).

REFERENCE SIGNS LIST 101 communication system
103 base station apparatus
105 neighboring base station apparatus
107 external control apparatus

The invention claimed is:

1. A communication system including a base station apparatus and
a neighboring base station apparatus adjacent to the base station apparatus comprising:
a transmission power control unit configured to instruct the neighboring base station apparatus, when an identification number of the base station apparatus needs to be changed, to increase transmission power before the identification number is changed such that a communication area of the neighboring base station apparatus covers a communication area of the base station apparatus, wherein
the neighboring base station apparatus increases the transmission power according to the instruction.

2. The communication system according to claim 1, wherein, when the identification number of the base station apparatus is changed, the base station apparatus stops operation and the transmission power control unit instructs the base station apparatus to resume operation and also instructs the neighboring base station apparatus to restore original transmission power.

3. The communication system according to claim 1, wherein a control apparatus independent from the base station apparatus and the neighboring base station apparatus have the transmission power control unit.

4. The communication system according to claim 1, wherein one or both of the base station apparatus and the neighboring base station apparatus has (have) the transmission power control unit.

5. A communication system including a base station apparatus and
a neighboring base station apparatus adjacent to the base station apparatus comprising:
a transmission power control means configured to instruct the neighboring base station apparatus, when an identification number of the base station apparatus needs to be changed, to increase transmission power before the identification number is changed such that a communication area of the neighboring base station apparatus covers a communication area of the base station apparatus, wherein
the neighboring base station apparatus increases the transmission power according to the instruction.

6. The communication system according to claim 5, wherein the base station apparatus stops operation when the identification number of the base station apparatus itself is changed, and the transmission power control means, when the identification number of the base station apparatus is changed, instructs the base station apparatus to resume operation and also instructs the neighboring base station apparatus to restore original transmission power.

7. A control apparatus for controlling a base station apparatus and a neighboring base station apparatus adjacent to the base station apparatus,
the control apparatus instructing the neighboring base station apparatus, when an identification number of the base station apparatus needs to be changed, to increase transmission power before the identification number is changed such that a communication area of the neighboring base station apparatus covers a communication area of the base station apparatus.

8. The control apparatus according to claim 7, when the identification number of the base station apparatus is changed and the base station apparatus stops operation, instructs the base station apparatus to resume operation and also instructs the neighboring base station apparatus to restore original transmission power.

9. A base station apparatus in a communication system comprising:
a transmission power control unit configured to instruct a neighboring base station apparatus, when an identification number of the base station apparatus itself needs to be changed, to increase transmission power before the identification number is changed such that a communication area of the neighboring base station apparatus covers a communication area of the base station apparatus.

* * * * *